United States Patent [19]

Lou et al.

[11] Patent Number: 4,911,939
[45] Date of Patent: Mar. 27, 1990

[54] SHELF-STABLE MICROWAVABLE COOKIE DOUGH

[75] Inventors: Wen C. Lou, Morris Plains; Richard D. Fazzolare, Randolph, both of N.J.

[73] Assignee: Nabisco Brands, Inc., East Hanover, N.J.

[21] Appl. No.: 260,701

[22] Filed: Oct. 21, 1988

[51] Int. Cl.$^4$ ............................................. A21D 13/00
[52] U.S. Cl. .................................... 426/241; 426/243; 426/551
[58] Field of Search ............... 426/549, 551, 241, 243, 426/94

[56] References Cited

U.S. PATENT DOCUMENTS

| | | | |
|---|---|---|---|
| 3,479,188 | 11/1969 | Thelen | 426/243 |
| 3,556,817 | 1/1971 | Jeppson | 426/241 |
| 3,767,421 | 10/1973 | Gulstad et al. | 426/551 |
| 3,767,422 | 10/1973 | Levitz | 426/551 |
| 4,157,403 | 6/1979 | Schiffmann et al. | 426/234 |
| 4,198,438 | 4/1980 | Singer et al. | |
| 4,230,924 | 10/1980 | Brastad et al. | |
| 4,267,420 | 5/1981 | Brastad | |
| 4,318,931 | 3/1982 | Schiffmann et al. | |
| 4,350,713 | 9/1982 | Dyson et al. | 426/243 |
| 4,396,635 | 8/1983 | Roudebush et al. | |
| 4,419,374 | 12/1983 | Pei | 426/243 |
| 4,448,791 | 5/1984 | Fulde et al. | |
| 4,463,020 | 7/1984 | Ottenberg | |
| 4,529,607 | 7/1985 | Lenchin et al. | |
| 4,560,559 | 12/1985 | Ottenberg | |
| 4,590,349 | 5/1986 | Brown et al. | |
| 4,626,641 | 12/1986 | Brown | |

FOREIGN PATENT DOCUMENTS 2729241 1/1978 Fed. Rep. of Germany .

Primary Examiner—Donald E. Czaja
Assistant Examiner—Mary S. Mims
Attorney, Agent, or Firm—Richard Kornutik

[57] ABSTRACT

Microwave-baked cookies can be prepared from a particular cookie dough composition. This cookie dough composition is shelf-stable and should contain gluten, pregelatinized starch and high fructose corn syrup. After being prepared, the cookie dough is formed into individual cookie pieces and prebaked for a short period of time in order to shape the cookie and to provide a gluten-containing skin on the cookie's surface. The prebaked cookie is then packaged and sealed. In this state, the prebaked cookie dough pieces have an extended shelf life. When the cookie dough is to be microwave-baked, it is placed in a microwave oven, optionally covered at least in part by a microwave susceptor material, and the baking process initiated for the instructed time. The result is a hot baked cookie having the taste and texture of a home-baked cookie.

19 Claims, No Drawings

SHELF-STABLE MICROWAVABLE COOKIE DOUGH

This invention relates to a formulation for cookie dough that can be baked using microwave radiation as the heating source. More particularly, this invention relates to the formulation for a cookie dough and the technique for baking this cookie dough to produce hot, home-baked type cookies using a microwave oven.

It is known that microwave cooking in general decreases the time that is required in order to cook a substance. One reason for this is that in microwave cooking the item is being cooked internally as well as externally at almost the same time. That is, the microwave radiation penetrates throughout the item being cooked thereby heating and cooking this item. In contrast, convection oven cooking cooks an item from the exterior surface inwardly As the heat penetrates inwardly it gradually cooks the inwardly located portions of the item. Microwave cooking has the definite advantage of providing a faster technique for cooking an item. The penetration of the microwave energy will depend to a degree on the size of the food item and on its composition and density. However, there are many drawbacks with regard to microwave cooking. As a result, microwave ovens have usually been used as sources of heat for thawing and reheating cooked foods rather than for fully cooking foods.

There have been particular problems with regard to using microwave ovens as a means for baking various products. For instance, in the baking of bread using microwave ovens there was always the need to use a conventional oven in a final step to brown the loaf of bread. Further, the use of microwave energy did not produce a consistent texture throughout the interior portion of the loaf. In general, during microwave baking, the bread loaves tend to collapse and also tend to have a poor, rubbery interior structure. In the baking of cakes it was found that when a cake batter is baked in a microwave oven, the outer edges become dry and tough while the center is not yet completely baked. Further, the texture of the cake is not the same as if the cake had been baked in a convection oven. That is, a moist, light, uniform air cells texture is not produced. Further, there is the added problem that the cake would not be browned in the microwave oven. If the cake is not to contain an icing to cover the surface, a final step of baking in a conventional oven would be required in order to produce the consumer-desired brown appearance to the cake's surface.

There are thus many problems that must be overcome when it is desired to utilize a microwave oven for baking rather than a conventional convection oven. This applies to cookies as well as baked goods as breads and cakes. It is not possible to take a conventional cookie dough, to bake that cookie dough in a microwave oven and to thus produce a fully baked cookie which has the texture an appearance of a cookie baked in a convection oven. In order to produce baked cookies using microwave ovens, it is necessary that the cookie dough have a particular formulation and, further, that the cookie dough be baked in the microwave oven utilizing particular enclosures. The particular enclosures will provide for a means to brown the surface of the cookie while the interior portions of the cookie are being fully baked. The particular dough composition must be one which has the texture and taste of a home-baked cookie when the cookie has been fully baked. This includes the cookie having a given degree of spread and a given degree of rise. It is well known that cookies, during the baking process, will spread on the baking pan and, further, will to a certain extent rise and produce a smooth interior texture within the cookie.

In addition to these required properties for the cookie dough composition, there is also a requirement that the cookie dough be storage stable at ambient conditions. This is also called being shelf stable. This is important since it is one objective that the cookie dough will be mass-marketed through supermarkets. It will not be refrigerated or frozen, but rather will appear along with the other cookies that are displayed at room temperature. This is a significant requirement for this dough composition. In a fully baked cookie, it has undergone at least several minutes at a high temperature which in essence any pathogenic microorganisms in the cookie dough and reduces the water content to a water activity (Aw) of 0.65 or less which inhibits microbial growth. However, when a fully baked or a partially baked dough is to be maintained at room temperature for an extended period of time there exists the problem of microbial growth and other decomposition of the dough due to a high water activity.

These are all formidable problems. However, it is an objective of the present invention to set forth a dough composition which can be utilized to make microwaveable baked cookies. Further, this dough composition can be stored for extended periods of time at room temperature. In addition, this dough composition, upon being baked utilizing certain microwave energy-absorbing devices, will have a browned surface as well as having a fully baked interior. Additionally, the interior will have a texture equivalent to that of a cookie baked in a convection oven.

The present compositions and methods overcome the problems of the various prior art processes. For instance, in U.S. Pat. No. 4,157,403 there is disclosed a process for the microwave baking of brown-and-serve products. In this patent it is disclosed that the sponge and dough preparation is formed into the brown-and-serve rolls which are then loaded into the carton. These rolls undergo a step of microwave proofing for a period of time of about 14 to 16 minutes. After the step of microwave proofing, the brown-and-serve rolls undergo a step of microwave baking of a period of time of from 4 to 6 minutes. The brown-and-serve rolls are then wrapped and ready for transportation to the point of sale. What is disclosed here is a technique for baking rolls that will subsequently be heated and browned in a conventional convection oven by the purchaser. The advantage to the process of this patent is set forth as a considerable savings in time for the manufacturer over a process which utilizes conventional oven baking.

U.S. Pat. No. 4,198,438 discloses a modified gluten product used in baking applications. The modified gluten product consists of the reaction product of gluten and xanthan gum. This patent is directed to the baking of bread where gluten is an important component. The modified gluten has been found to provide a bread loaf with a better volume and texture. This modified gluten is specifically directed to the baking of breads.

U.S. Pat. No. 4,230,924 is directed to a food package which consists of a flexible wrapping sheet of a dielectric material, such as a polyester or paperboard. This flexible wrapping must be capable of conforming to at least a portion of an article of food which is to be packaged. Further, the dielectric material which is contained on the flexible wrapping sheet consists of a layer of a metal such as aluminum. This may be a continuous or a discontinuous layer of aluminum. The objective of this package is for some of the microwave radiant energy to traverse through the wrapping sheet and to thus contact and heat the wrapped food while the energy that is absorbed by the dielectric portion of the wrapping sheet will be heated and will provide for a browning of the surface of the food item. In this type of packaging the wrapping sheet which contains a dielectric material will be in contact with all, or substantially all, of the surface of the food item that is being cooked.

U.S. Pat. No. 4,267,420 discloses a flexible wrapping sheet which is similar to that of above U.S. Paten 4,230,924. The primary difference is that the wrapping film is a plastic wrapping film which has a very thin coating thereon for the absorption of microwave energy. By the use of such a wrapping film, only a portion of the incident microwave energy is converted to heat by the wrapping film. The remainder of the microwave radiant energy passes through the film and heats the food item which is contained within the wrapping film. The wrapping film, however, will become sufficiently heated to as to brown and to crispen the exterior surface of the food item.

U.S. Pat. No. 4,318,931 discloses a process for the baking of firm bread which uses a two-stage baking process. In the first stage, the bread is baked using conventional heating and is contained in covered baking pans that are normally used for baking firm bread. In the second stage, there is the simultaneous use of conventional convection heating and microwave energy heating. The objective here is to reduce the baking time for producing the firm bread. It was found that this could be done if, in the second stage of the baking operation, that two modes of heat generation were utilized. Using this technique there is a savings in baking time of about 50 percent.

U.S. Pat. No. 4,396,655 discloses a cake mix which can be baked in a microwave oven rather than in a convection oven. This cake mix must have a particular composition. This composition consists of from about 60 percent to about 85 percent of a sugar and flour mixture. The ratio of sugar to flour is from about 1.4 to 1 to about 2 to 1. The composition will also contain from about 1 percent to about 5 percent of a leavening agent, from about 0 percent to about 16 percent of a shortening, from about 2 percent to about 10 percent of an emulsifier and with the balance being conventional cake additives. These various cake additives can consist of flavorants such as cocoa, vanilla, chocolate, spices, fruits and nuts. In addition, the composition can contain thickeners, nutrients, and oxidants and antimicrobial agents, nonfat milk solids, egg solids and starches. The leavening agent is a chemical leavening agent. It was found that this composition will, upon being baked in a microwave oven, produce a cake having a good texture and moistness.

U.S. Pat. No. 4,448,791 discloses a reactive dough composition that can be used as the upper layer of a food item which contains a crust. Such food items would include various dinner pot pies as well as various dessert pies. The reactive dough composition contains as the essential active ingredients a reducing sugar such as dextrose and an amino acid source. Upon heating, these two components undergo the Maillard reaction which results in the formation of a brown coloration. This brownable pie crust is particularly usable with regard to pot pies which contain a fully cooked item and wherein the microwave energy is utilized to thaw and heat the contained item and then also to provide a browning of the crust.

U.S. Pat. No. 4,463,020 discloses wheat-based food products which contain yeast as the leavening agent. These wheat-based food products are comprised of wheat flour, yeast and an amount of long grain rice flour which is utilized to reduce the deterioration of the palatability of the food product during microwave heating. The objective of this patent is to provide a fully baked bread product which can be heated in a microwave oven prior to eating. Upon such a heating, there is no deterioration in the palatability of the bread. That is, the bread will not become soggy, hard and lumpy, gummy or rubbery. This bread is specifically directed for use in making sandwich rolls where the sandwiches are prepared, wrapped and later reheated in a microwave oven by the purchaser. The objective here is to enhance the palatability of the overall sandwich by enhancing the palatability of the bread. It was found that a long grain rice flour would have the attribute to enhance the palatability of such breads.

U.S. Pat. No. 4,529,607 discloses a process for producing a batter which is suitable for use in microwave cooking. This batter will contain a high amylose content flour. The objective in this patent is to produce a batter that can be coated on such items as chicken or fish sticks that are to be prepared by the consumer utilizing a microwave oven. The objective is to provide a batter which, when coated onto one of the foregoing food items and the food item is heated in a microwave oven, will not become soggy. This is a problem with conventional batters that are utilized on similar food products which are heated by the consumer in a standard convection oven. Apparently, a batter that is produced utilizing a high amylose flour will provide for a crisp outer coating on the food product after microwave heating.

U.S. Pat. No. 4,590,349 describes a carton that can be utilized in a microwave oven for the browning and crisping of food on two sides The container is comprised of paperboard and contains a panel which absorbs microwave energy and creates heat. Also a part of this panel is a means to absorb moisture and grease that is released by the item that is being cooked during the cooking process This package is specifically adapted for the cooking of items such as chicken. During the cooking cycle the package is inverted in order to cook the chicken pieces more evenly. Also, as a result of the inverting of the package, the released moisture and oil is absorbed into a layer of material in the panel which contains the microwave energy-absorbing layer. In this container the microwave energy-absorbing panel is planar in nature.

U.S. Pat. No. 4,560,559 is directed to wheat-based food products which have an improved resistance to deterioration in palatability due to exposure to microwave radiant energy. This development is specifically directed to yeast-raised products It was found that the use of rice starch was most effective in improving the resistance of yeast-raised, wheat-based food products to microwave deterioration Apparently, rice starch has the appropriate crystal size which assists in the preservation of the palatability of the yeast-raised wheat-based products.

U.S. Pat. No. 4,626,641 is directed to a carton and technique for the microwave heating of fruit and meat types of pies. This carton contains the meat- or fruit-based pie and has on the upper surface thereof a microwave energy-absorbing layer suitable for converting microwave energy into radiant heat. That is, while radiant energy that enters the packaging through the other surfaces thaws and heats the pie, the radiant heat that is created browns the upper surface of the pie. In this carton, the microwave energy-absorbing material is shown to be comprised of a planar sheet of material.

Japanese Patent Publication 213,351 discloses the production of sponge cake products. These are produced by microwave heating. Important ingredients in these sponge cake products are apparently synthetic resins such as polystyrene, polypropylene and polymethacrylate German Patent 2,729,241 discloses a microwave baking method which is used for the final baking of partially baked rolls. This method comprises the production of a dough, shaping the dough into individual pieces, placing these individual pieces in separate vessels, subjecting the dough in these separate vessels to microwave energy, and in a final step, baking the dough utilizing microwave energy. The preferred frequency ranges that are utilized are 915 MHz and 2,450 MHz. The primary advantage of this technique is the short baking time.

This prior art discloses various compositions and various containers for producing baked goods utilizing microwave ovens. However, there is no disclosure with regard to producing cookies through the use of microwave baking techniques. Further, there is no disclosure with regard to a cookie dough which would be storage stable at room temperature for extended periods of time and which could then be baked by the consumer in a microwave oven in order to produce cookies having a home-baked taste and texture.

BRIEF SUMMARY OF THE INVENTION

It has been found that cookies can be produced utilizing microwave energy as the source of heat for baking. The net result is that the consumer can quickly and easily produce hot, home-baked cookies. Further, this cookie dough has an extended shelf life so that in stores, or at home, it need not be stored in a refrigerator or freezer. When the cookie dough is stored in a refrigerator or a freezer a longer shelf life is expected.

The present cookie dough is comprised of many of the traditional cookie dough components. These include flour, sugar, shortening and a chemical leavening agent The other ingredients that it contains are high fructose corn syrup, gluten and pregelatinized starches. In addition, the composition will contain amounts of dry whole egg powder, skim milk powder, salt, gums and other ingredients as are desired Further, the cookie composition will contain various flavorants such as spices, chocolate, fruits and nuts. Essentially any flavorant that is desired can be utilized.

Components which provide for some of the unique properties of this present cookie dough consist of the high fructose corn syrup, gluten and the pregelatinized starches. The high fructose corn syrup assists in the dough having a longer shelf life. This is the case since the high fructose corn syrup will permit the cookie to have a moist texture but yet will provide the cookie dough with a low water activity. Gluten, the use of which is usually avoided in cookies, is utilized in combination with the leavening agent to provide that the cookie will rise during the microwave baking and that it will also have a cookie texture. The gluten will also form a film on the cooked dough surface and thus assist in providing for an extended shelf life. Pregelatinized starches are used to ensure that the starches will be fully cooked during the shortened microwave baking process. The pregelatinized starches will affect the texture characteristics of the cookie Depending on the desired texture one or more pregelatinized starches are chosen for addition to the formulation.

After the cookie dough has been mixed and has been formed into individual pieces, the cookie dough pieces are prebaked in a conventional oven at a high temperature for a short period of time in order for the formation of the gluten-starch skin on the surface of the cookie dough. This baking is conducted at a temperature of about 325° F. to 500° F. for about 1 to 7 minutes The prebaking is conducted to form this outer skin layer on the cookie dough, but not for a period of time that would be sufficient to significantly react the chemical leavening agent. The chemical leavening agent is not substantially activated until the step of microwave baking of the cookie.

The prebaked cookies are then packaged and forwarded to the point of sale. At the point of sale, they are stored at room temperature. Upon purchase by the consumer, the consumer need only place one or more pieces of the prebaked cookie dough into a microwave oven and to place an enclosure over the prebaked cookie dough which will provide for a browning of the cookie while the cookie dough is being heated and baked in the microwave oven.

DETAILED DESCRIPTION OF THE INVENTION

As has been described, the present cookie dough is of a particular type that is storage stable but yet is capable of being baked in a microwave oven. The objective here is to provide to the consumer a prebaked cookie dough wherein the baking is completed by the consumer using a conventional microwave oven. The resulting cookie product from the microwave oven baking step is a hot cookie having the taste and texture of a home-baked cookie.

A key factor in this cookie dough is the particular formulation of this cookie dough. The cookie dough will contain the usual ingredients such as flour, shortening, chemical leavening agent, sugar and various flavorants. The flavorants will consist of spices, vanilla, chocolate, fruits and nuts. Other flavorants, as desired, can also be utilized. In addition to these ingredients, the present dough formulation will contain high fructose corn syrup, gluten and pregelatinized starches Further, various additives can also be a part of the dough composition. These other additives are dry whole egg powder, skim milk powder, salt and gums.

The flour, sugar and shortening are necessary ingredients for essentially all types of cookies. However, in the usual case when cookies are to be produced, a soft winter wheat flour which is low in gluten content is the flour of choice. The higher gluten content flours are generally used to produce breads, rolls and related bakery products. However, in the present case, the flour that is to be used need not be a low gluten content flour. The reason is that unlike other cookie formulations, it is intended in the present formulation to have a reasonably high gluten content. It has been found that by the inclusion of gluten in the formulation, there is the formation of a skin on the cookie during the prebaking process and further, the gluten assists in getting the desired rise in the cookie during the microwave baking step. That is, the gluten in combination with the chemical leavening agent will provide for a rising of the cookie dough during the microwave cooking step.

The skin on the prebaked cookie dough is believed to be the result of an interaction between the gluten and the starches. These two ingredients appear to combine in some manner to provide a skin over the surface of the cookie dough. This skin forms a weak crust on the prebaked cookie dough and enhances the shelf life of the cookie dough.

A high level of a high fructose corn syrup is used as a component of the cookie dough in order to maintain a low water activity for the cookie dough. The high fructose corn syrup will permit the resulting cookie to have a moist consistency, but yet will permit the cookie dough itself to have a water activity of less than 0.65. It is important that the prebaked cookie dough have a low water activity so that the cookie dough will be storage stable a room temperature. As the water activity of a cookie dough decreases, there is a concurrent decrease in the ability of microorganisms to grow on and within the cookie dough. Therefore, besides providing for a sweetening of the cookie dough, the high fructose corn syrup will also provide for a moistness in the final baked cookie.

The pregelatinized starches are used primarily as texture-enhancers and modifiers A high amylopectin pregelatinized starch provides a chewy, soft texture whereas a high amylose starch will provide a firmer texture. Pregelatinized starches are chosen since they exhibit a less starchy taste due to having been precooked.

Essentially any fine ground sugars can be utilized to make this cookie dough. These can be either fine ground white sugars or fine ground brown sugars. The choice of whether a brown sugar or a white sugar is utilized, and the ratio of one to the other, will result to a degree from the taste that is desired It is well-known that sugars are good humectant agents for lowering the water activity in foods. The use of high sugar levels may help in extending the shelf life of the cookie dough. The shortening that is utilized can be of any conventional shortening that is used to make cookies. Generally this is a vegetable oil shortening.

The leavening agent that is utilized will be a chemical leavening agent. Chemical leavening agents consist of an acidic component and a basic component which will release carbon dioxide upon reaction. The basic component that is utilized in chemical leavening agents will usually consist of a carbonate or of a bicarbonate. A commonly used basic component is sodium bicarbonate. The acidic component can be essentially any edible grade acidic material which will react with the basic component to release carbon dioxide. Suitable chemical leavening agents are diammonium phosphate, sodium aluminum pyrophosphate and calcium ammonium phosphate. However, other edible grade acidic components can be utilized.

The other components that are a part of the cookie dough will consist of flavorants, and ingredients such as dry whole egg powder, skim milk powder, salt and gums. A useful gum is sodium alginate. The gum assists in maintaining a low water activity level. Various other additives or preservatives can also be added.

In the formulation of the cookie dough composition it is preferred that certain ingredients are formed into a mixture having a cream consistency. This will include the mixing of the high fructose corn syrup, vegetable shortening and water with sugar, salt, gum, and dry whole egg powder and skim milk powder when these latter two ingredients are a part of the composition. These are formed into a creamy mixture. The other dry ingredients, flour, pregelatinized starches and chemical leavening agent are then added to the creamy mixture and mixing is continued to form the dough. Any type of a dough mixer can be utilized that will thoroughly intermix the components, one into the other. Suitable dough mixing equipment is well known in the art. The fully mixed dough will be sticky to the touch, will be soft and formable into individual cookies and will have slack dough characteristics.

After the dough has been fully mixed, it is then formed into the individual shapes for each cookie by any suitable cookie dough cutter such as a wire cutter or a rotary molder. The cookies can vary in size from a diameter of about 30 mm to a diameter of 80 mm or more. The size of the cookie is not a critical factor. After the individual cookies are formed, they are then prebaked at an elevated temperature for a short period of time. During the prebaking step the cookie will undergo some spreading, and will undergo a slight amount of rising. The degree of spreading will range from about 10 percent to about 30 percent in area. There is a slight amount of rising of the individual cookies due to the fact that the duration in the oven is only sufficient to heat the surface of the cookie to form a soft skin and not significantly to activate the chemical leavening agent in the interior of the dough. The oven temperature that is utilized is in the range of about 325° F. to 500° F. and preferably about 375° F. to 450° F. The residence time of the cookie in the oven will range from about 1 minute to about 7 minutes. However, rather than time and temperature being the key determinants during the prebaking step, it is more important that the chemical leavening agent not be significantly activated at this point. Therefore, rather than focusing on a defined temperature and a defined time, it is more realistic to focus on the activation of the chemical leavening agent and any degree of rise that occurs to the cookie during this prebake step.

The prebake step is conducted in a conventional cookie baking oven. The cookies emerge from the oven at an elevated temperature and with a slight or no browning on the surface. The cookies are then cooled on a conveyor belt and passed to packaging. In the usual instance, the prebaked cookie dough will be placed on a plastic or other tray and the tray then hermetically sealed with a plastic film or, in the alternative, several layers of the prebaked cookies on a film stacked in an array to form a slug and this slug then hermetically sealed in a plastic film. These sealed cookies are then placed into a carton and shipped to the retail point of sale. The carton will contain the instructions to the consumer for the microwave baking procedure.

The amount of the various individual ingredients will vary from one type of cookie to another type of cookie. However, there are ranges of the components that should be used. This is particularly the case with regard to the high fructose corn syrup, gluten and pregelatinized starch components. These are key components of the dough composition and must be present in certain quantities. Based on 100 parts by weight of flour, the dough composition will contain from about 30 to 60 parts by weight of high fructose corn syrup, from about 3 to about 10 parts by weight of gluten, and from about 3 to about 10 parts by weight of pregelatinized starch. As noted above, the exact amount utilized will depend on the particular cookie dough composition that is being produced.

The sugar content of the composition can vary fairly widely. The sugar content can range from about 40 parts to about 60 parts by weight, and preferably from about 40 parts to about 50 parts by weight of the flour. This would be the total of the white sugar and of the brown sugar. The shortening content can also vary fairly widely. The shortening content will range from about 25 parts by weight to about 50 parts by weight, and preferably about 30 parts by weight to 45 parts by weight of the flour content. The chemical leavening agent will be added in an amount to produce the desired degree of rise during the microwave baking of the prebaked cookie dough. In general, the chemical leavening agent content will range from about 1 part to about 5 parts by weight, and preferably about 1.5 parts to about 3.0 parts by weight of the flour content When a gum is added it is added in an amount of about 0.05 to 0.5 part by weight of flour and preferably about 0.1 to 0.3 part by weight.

The other components, such as dry whole egg powder, skim milk powder, salt and various flavorants are added in an amount to produce a particular taste and/or texture. Gums increase moistness while maintaining a low water activity. It is also possible that one or more of these ingredients can be deleted with regard to a particular dough composition However, they are usually present.

In order to microwave bake the present prebaked cookies, it is only necessary to open the package and to remove the number of prebaked dough forms that are desired to be baked at that point in time. The cookies can be directly microwave baked or, in the alternative, a microwave susceptor material can be placed over the prebaked cookie and then placed in the oven. A microwave susceptor material will absorb some or all of the microwave radiant energy and convert it to heat. The heat that is thus produced will serve to brown the exterior surface of the cookies. The appropriate microwave susceptor materials would be supplied to the consumer in the package that contains the prebaked cookie dough pieces As an alternative, the prebaked cookies can be packaged within closures which already contain a microwave susceptor material within or over a part of, or all of, its surface. In this way, the cookie merely needs to be placed within the microwave oven within its packaging in order to be baked. After the baking step is completed, the browned and baked cookie is removed from its packaging and consumed.

As noted above, during the microwave cooking step the prebaked cookie will rise. This prebaked cookie will also spread. The degree of spread will not be as much as from the original cookie to the prebaked cookie dough state. The degree of spread will be within the range of about 5 percent to about 20 percent in area. However, the amount of rise of the cookie dough will be more significant. The cookie dough will rise from about 20 percent to 80 percent and preferably from about 30 percent to 60 percent. During the microwave cooking step, the cookie will decrease in moisture content to less than about 10 percent by weight and preferably less than about 8 percent by weight.

As noted above, essentially any cookie that can be prepared in a bake ship can be prepared utilizing the present process. There are no limitations on the type of cookie that can be produced. Also, these cookies can contain either small or larger amounts of other additives such as chocolate chips or chocolate chunks. They can also contain spices, fruits and nuts. This will be a personal choice with regard to the particular cookie. The foregoing description will not be set forth in more detail with specific reference to the following examples.

EXAMPLE 1

A mixture consisting of 43 pounds of high fructose corn syrup, 37 pounds of shortening, 20 pounds of fine ground white sugar, 26 pounds of fine ground brown sugar, 4 pounds of dry whole egg solids, 4 pounds of skim milk powder and 1.33 pounds of salt was mixed at low speed in a Hobart mixer for about 5 minutes. Seventeen pounds of water was then added to the above mixture and mixing continued for about 3 minutes at the same mixer speed. The resultant mixture was a creamy smooth mixture. A dry blend consisting of 100 pounds of low gluten wheat flour, 7.5 pounds of pregelatinized high amylopection starch, 1.67 pounds of sodium bicarbonate, and 0.34 pounds of diammonium phosphate was added to the above mixture. Mixing was continued until a thoroughly intermixed dough mass was produced. The dough mass was formed into cookie-sized dough pieces having a diameter of about 35 mm and a height of about 5 mm. These cookie-sized dough pieces were baked in pre-heated oven at 450° F. for about 3 minutes. At this temperature, the cookie-sized dough pieces were heated on the exterior to about 400° F. but the interior temperature was not sufficient in order to significantly activate the chemical leavening agent. The resulting partially baked cookies had a diameter of about 45 mm and a height of about 8 mm. These partially baked cookies were then placed on a plastic tray and a conical-shaped microwave susceptor material placed over each cookie. The partially baked cookies were placed in a 600 watt microwave oven at a 100 percent power setting for 45 seconds. After contact with microwave energy for this period of time, the cookies were fully baked and were deeply browned on the top and side surfaces. The cookies had a moist, smooth and soft texture.

EXAMPLE 2

The procedure of Example 1 was repeated except that the pre-gelatinized starch was high amylose starch. The amount of starch used based on 100 pounds of flour was 6 pounds. The resulting cookie had a firmer texture than in Example 1.

EXAMPLE 3

The procedure of Example 1 was repeated except that 35 pounds of chocolate chips were incorporated into the formulation. The resulting baked cookie had a home made chocolate chip cookie taste, texture and appearance.

EXAMPLE 4

The procedure of Example 1 was repeated except that 0.5 pounds of vanilla and butter flavorants were added. The resulting cookie had a more buttery taste and aroma.

What is claimed is:

1. Shelf-stable, substantially unleavened cookie dough pieces suitable for baking using microwave energy as the heat source comprising flour, sugar, shortening, gluten, pregelatinized starch and a chemical leavening agent, wherein said cookie dough pieces have been partially baked to form a protective skin layer on the surface of said cookies, but wherein said leavening agent has not been significantly reacted and wherein the cookie dough pieces is leavable and can be substantially baked by microwave energy.

2. A shelf-stable cookie dough as in claim 2 wherein based on 100 parts by weight of said flour said cookie dough contains from about 30 parts to about 60 parts by weight of sugar and from about 25 parts to about 50 parts by weight of a shortening.

3. A shelf-stable cookie dough as in claim 2 wherein said cookie dough contains from about 40 parts to about 60 parts by weight of a high fructose corn syrup.

4. A shelf-stable cookie dough as in claim 2 wherein based on 100 parts by weight of said flour said cookie dough contains from about 1 to about 3 parts by weight of a leavening agent, from about 3 parts to about 10 parts by weight of pregelatinized starch and from about 3 parts to about 10 parts by weight of gluten.

5. A shelf-stable cookie dough as in claim 1 wherein said cookie dough contains flavorants selected from the group consisting of chocolate, vanilla, spices, nuts, butter, brown sugar, fruits and mixtures thereof.

6. A shelf-stable cookie dough as in claim 1 wherein said cookie dough is in the form of pieces and upon being hermetically sealed said cookie dough pieces are storage stable.

7. A shelf-stable cookie dough as in claim 1 wherein upon the application of microwave energy the chemical leavening agent will become activated and the cookie dough pieces will rise during the application of microwave energy.

8. A method of making substantially unleavened shelf-stable cookies comprising:
   a. forming a cookie dough comprising flour, sugar and shortening, gluten, pregelatinized starch and a chemical leavening agent;
   b. forming said cookie dough into individual cookies; and
   c. partially baking said cookies at a sufficiently high temperature and for sufficient time to form a protective skin on the surface of said cookies, but for a sufficiently short baking time so as not to significantly react the chemical leavening agent and without substantial cooking of the dough whereby said cookies are leavable by microwave energy.

9. A method as in claim 8 wherein said cookies are partially baked at a temperature of 325° F. to about 500° F. for a period of time of about 1 minute to about 7 minutes.

10. A method as in claim 8 wherein said cookie dough based on 100 parts by weight of flour contains from about 30 parts to about 60 parts by weight of sugar, from about 25 to about 50 parts by weight of shortening from about 3 to about 10 parts by weight of gluten and from 1 to about 3 parts by weight of a chemical leavening agent.

11. A method as in claim 8 wherein said cookie dough contains from about 40 parts by weight to about 60 parts by weight of high fructose corn syrup.

12. A method as in claim 8 wherein said cookie dough contains flavorants selected from the group consisting of chocolate, vanilla, spices, nuts, butter, brown sugar, fruits and mixtures thereof.

13. A method of baking cookies comprising:
   a. forming a cookie dough comprising flour, sugar, shortening, gluten, a pregelatinized starch, and a leavening agent;
   b. forming said cookie dough into individual cookies;
   c. partially baking said cookies at a sufficiently high temperature to form a skin on the surface of said cookies, but for a sufficiently short baking time so as not to significantly react the leavening agent; and
   d. placing at least one of said partially baked cookies in an enclosure that has as a part of its structure a microwave energy-absorbing material and subjecting said enclosure to microwave radiation for a period of time sufficient to bake and brown said cookies.

14. A method as in claim 13 wherein said cookies are partially baked at a temperature of about 325° F. to about 500° F. for a period of time of about 1 minute to about 7 minutes.

15. A method as in claim 13 wherein based on 100 parts by weight of flour said cookie dough contains from about 3 to 10 parts by weight of gluten and from about 1 to 3 parts by weight of a chemical leavening agent.

16. A method as in claim 13 wherein based on 100 parts by weight of flour said cookie dough contains from about 40 parts to about 50 parts by weight of sugar and from about 25 to about 50 parts by weight of shortening.

17. A method as in claim 13 wherein based on 100 parts by weight of flour said cookie dough contains from about 40 parts by weight to about 60 parts by weight of high fructose corn syrup.

18. A method as in claim 13 wherein said cookie dough contains flavorants selected from the group consisting of chocolate, vanilla, spices, nuts, butter, brown sugar, fruits and mixtures thereof.

19. A microwaveable, shelf-stable preformed cookie dough pieces including ingredients comprising about 100 parts by weight flour, about 30 to 60 parts by weight sugar, about 25 to 50 parts by weight shortening, about 1 to 3 parts by weight chemical leavening agent and about 3 parts to 10 parts by weight added gluten, wherein the leavening agent is substantially unactivated and the cookie dough piece includes an outer protective skin formed by the gluten by subjecting the cookie dough piece to a sufficient temperature and for a sufficient time to form said skin without substantial activation of the leavening agent.

* * * * *